United States Patent
Guo et al.

(10) Patent No.: US 12,322,764 B2
(45) Date of Patent: *Jun. 3, 2025

(54) CARTRIDGE, BATTERY ASSEMBLY AND ELECTRONIC CIGARETTE

(71) Applicant: Joyetech Europe Holding GmbH, Zug (CH)

(72) Inventors: David Guo, Irvine, CA (US); Weihua Qiu, Jiangsu (CN); Neng Hua, Jiangsu (CN); Xiaoqi Xu, Jiangsu (CN)

(73) Assignee: Joyetech Europe Holding GmbH, Zug (CH)

( * ) Notice: Subject to any disclaimer, the term of this patent is extended or adjusted under 35 U.S.C. 154(b) by 927 days.

This patent is subject to a terminal disclaimer.

(21) Appl. No.: 17/479,731

(22) Filed: Sep. 20, 2021

(65) Prior Publication Data
US 2022/0006130 A1 Jan. 6, 2022

Related U.S. Application Data

(63) Continuation of application No. 15/927,081, filed on Mar. 21, 2018, now Pat. No. 11,127,988.

(60) Provisional application No. 62/478,451, filed on Mar. 29, 2017.

(51) Int. Cl.
| | | |
|---|---|---|
| A24F 40/42 | (2020.01) | |
| A24F 40/44 | (2020.01) | |
| A24F 40/46 | (2020.01) | |
| A24F 40/485 | (2020.01) | |
| H01M 10/42 | (2006.01) | |
| H01M 50/247 | (2021.01) | |
| H01M 50/284 | (2021.01) | |
| H05B 3/04 | (2006.01) | |
| H05B 3/14 | (2006.01) | |
| H05B 3/44 | (2006.01) | |

(Continued)

(52) U.S. Cl.
CPC .......... *H01M 10/425* (2013.01); *A24F 40/42* (2020.01); *A24F 40/44* (2020.01); *A24F 40/46* (2020.01); *A24F 40/485* (2020.01); *H01M 50/247* (2021.01); *H01M 50/284* (2021.01); *H05B 3/04* (2013.01); *H05B 3/141* (2013.01); *H05B 3/44* (2013.01); *A24F 40/10* (2020.01); *H01M 50/24* (2021.01); *H01M 2220/30* (2013.01); *H05B 2203/021* (2013.01); *H05B 2203/022* (2013.01)

(58) Field of Classification Search
None
See application file for complete search history.

(56) References Cited

U.S. PATENT DOCUMENTS

| | | | |
|---|---|---|---|
| 11,127,988 B2 * | 9/2021 | Guo et al. | ............. H05B 3/141 |
| 2006/0131439 A1 | 6/2006 | Lakatos et al. | |

FOREIGN PATENT DOCUMENTS

| | | | | |
|---|---|---|---|---|
| CN | 204146338 | * | 2/2015 | ............. A24F 47/00 |
| CN | 204146338 U | | 2/2015 | |

* cited by examiner

*Primary Examiner* — Dionne W. Mayes
(74) *Attorney, Agent, or Firm* — NKL Law; Allen Xue

(57) ABSTRACT

The present disclosure provides a cartridge, a battery assembly and an electronic cigarette. The cartridge, includes: a liquid absorbing assembly, and a liquid container for supplying tobacco liquid to the liquid absorbing element, the liquid absorbing element is arranged below the liquid container, the liquid absorbing assembly is arranged in such a manner that the tobacco liquid is kept in the liquid container or the liquid absorbing element before the cartridge is assembled at an in-use state.

12 Claims, 15 Drawing Sheets

(51) Int. Cl.
*A24F 40/10* (2020.01)
*H01M 50/24* (2021.01)

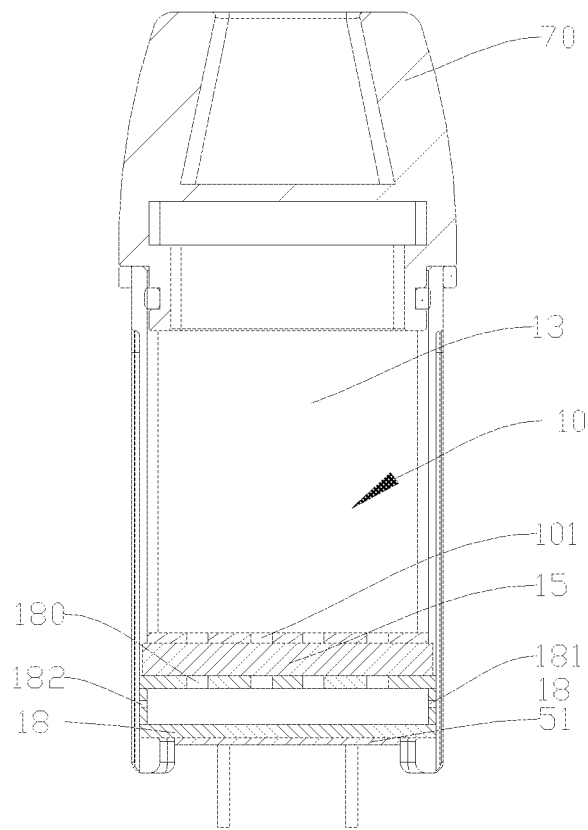
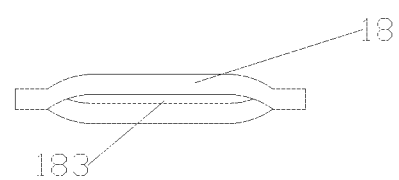
FIG.6A  FIG.6B
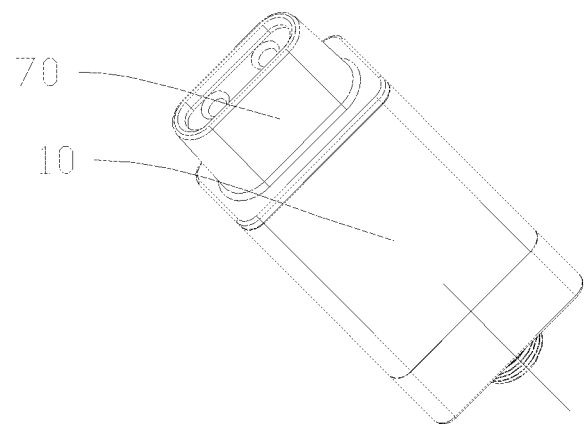
FIG.7A

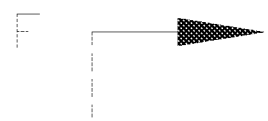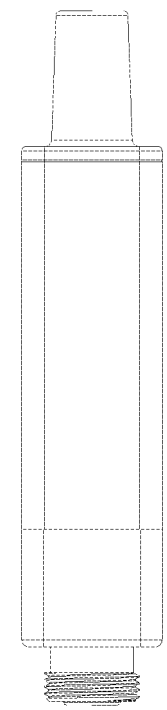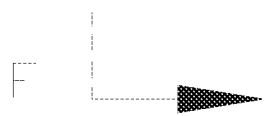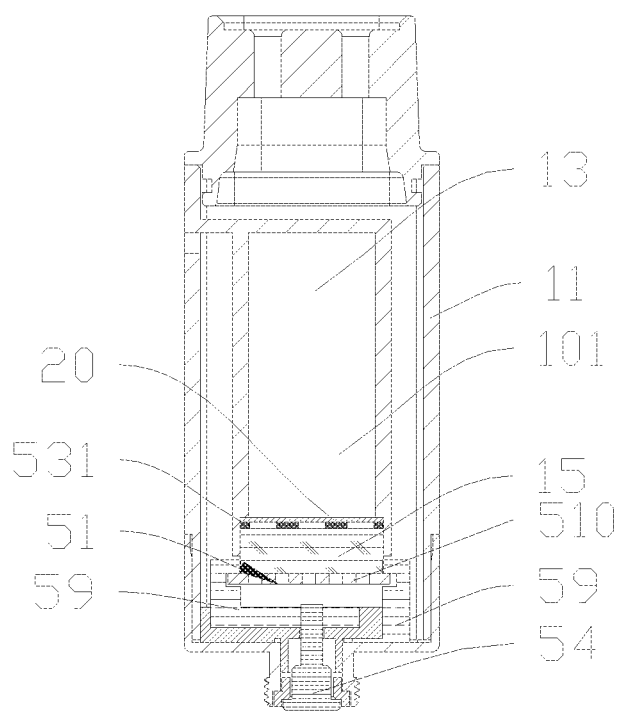
FIG.7B  FIG.7C

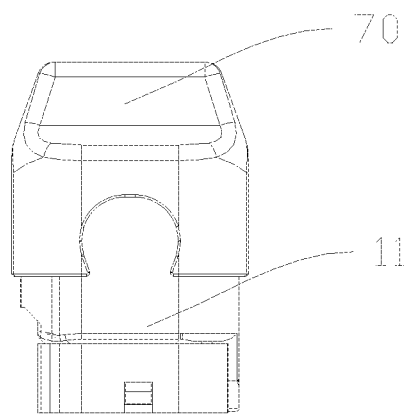
FIG.8D
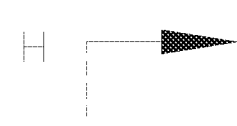
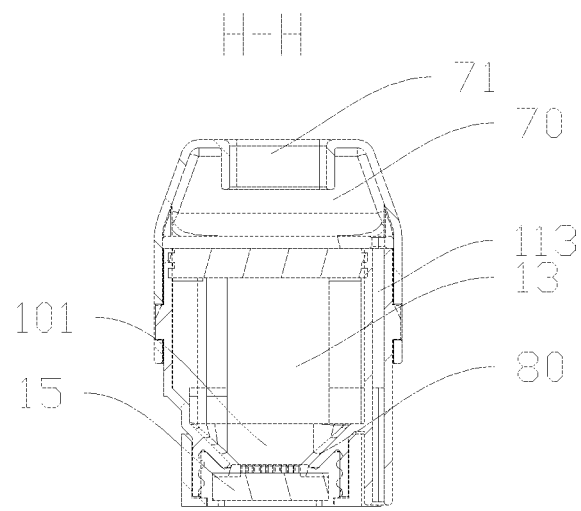
FIG.8E      FIG.8F
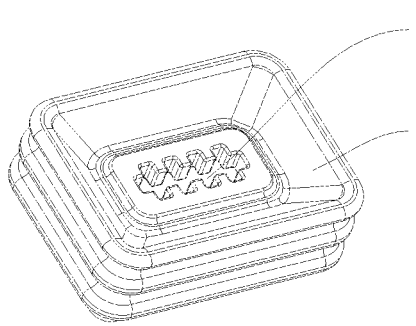
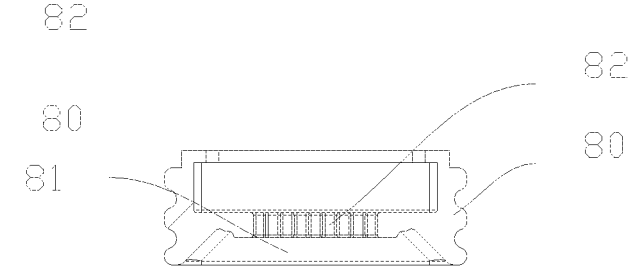
FIG.8G      FIG.8H

CARTRIDGE, BATTERY ASSEMBLY AND ELECTRONIC CIGARETTE

CROSS-REFERENCE TO RELATED APPLICATIONS

This application is a continuation application of U.S. application Ser. No. 15/927,081, filed on Mar. 21, 2018, which claims priority to U.S. provisional application Ser. No. 62/478,451, filed on Mar. 29, 2017, the subject matter of which is hereby incorporated by reference in its entirety.

TECHNICAL FIELD

The present disclosure relates to the field of smoking simulating and, in particular, to a cartridge, a battery assembly and an electronic cigarette.

BACKGROUND

Electronic cigarettes are well known. A conventional electronic cigarette includes a cartridge and a battery assembly, where the cartridge further includes a liquid storage assembly and an atomizing assembly, the liquid storage assembly provides tobacco liquid to the atomizing assembly, which is electrically driven by the battery assembly and thereby atomizes the tobacco liquid into vapor for users to enjoy. Therefore, the whole cartridge should be discarded due to the exhaustion of the tobacco liquid in the liquid storage assembly. However, it may be possible that the atomizing assembly of the cartridge is still in good condition at this time, thus it is wasteful to discard the whole cartridge.

Despite numerous designs currently available, there is a need for additional designs of electronic cigarettes.

SUMMARY

In view of existing deficiencies, the present disclosure provides a cartridge, battery assembly and electronic cigarette, so as to solve the problem that it is wasteful to discard the whole cartridge when the tobacco liquid in the liquid storage assembly is used up while the atomizing assembly of the cartridge is still in good condition.

A cartridge includes a liquid absorbing assembly and a liquid container for supplying tobacco liquid to the liquid absorbing element. The liquid absorbing assembly is arranged in such a manner that the tobacco liquid is kept in the liquid container or the liquid absorbing element before the cartridge is assembled at an in-use state.

According to one embodiment, the liquid absorbing element is formed of rigid material.

According to one embodiment, the liquid absorbing assembly further comprises a membrane and a puncturing unit. The membrane is arranged on a bottom of the liquid container, and the puncturing unit is arranged with a predefined distance below the membrane.

According to one embodiment, the cartridge further includes a heater removably located below the liquid absorbing assembly. The puncturing unit includes a puncturing element and an elastic element. One end of the puncturing element is attached to the heater, and the opposite end of the puncturing element is protruded above the liquid absorbing assembly.

According to one embodiment, the elastic element is elastically compressively disposed between the puncturing element and the bottom of the liquid container. One end of the elastic element abuts against the puncturing element and the other end of the elastic element abuts against the bottom of the liquid container.

According to one embodiment, the puncturing unit includes a puncturing element and an elastic element. The puncturing element is attached to the cartridge or the liquid absorbing assembly. The elastic element is elastically compressively disposed between the liquid absorbing assembly and the bottom of the liquid container.

According to one embodiment, the cartridge further includes a heater arranged below the liquid absorbing assembly, and a liquid adjusting element removably attached to the cartridge.

According to one embodiment, the liquid absorbing assembly includes a first absorbing assembly and a second absorbing assembly separated from the first absorbing assembly by the liquid adjusting element, when the liquid adjusting element is assembled at a non-use state.

According to one embodiment, the cartridge further includes a cartridge shell, a liquid container located within the cartridge shell. A portion of the liquid adjusting element is arranged within the cartridge shell. The liquid adjusting element is provided with an upper positioning slot, a lower positioning slot and a positioning element. The upper positioning slot is arranged in parallel to a bottom surface of the liquid container. The lower positioning slot is arranged on the bottom of the liquid adjusting element. The positioning element is configured to cooperate with the upper positioning slot and the lower positioning slot to maintain the liquid adjusting element in preset positions.

According to one embodiment, the cartridge includes a liquid adjusting element a heater and a cartridge shell. The liquid container located within the cartridge shell. The heater is arranged below the liquid absorbing assembly. The liquid absorbing assembly is partially in contact with the heater. The liquid adjusting element is rotatably disposed between the cartridge shell and the liquid absorbing assembly.

According to one embodiment, the liquid adjusting element defines one or more liquid adjusting outlets corresponding to the outflow pathways defined on the liquid container.

According to one embodiment, the cartridge further includes a heat transferring element arranged below the liquid absorbing assembly, the upper surface of the heat transferring element defines one or more vapor outlets, one side of the heat transferring element is provided with an air inlet opening, and the other side of the heat transferring element is provided with a vapor outlet opening.

According to one embodiment, the liquid absorbing assembly further comprises a joint element. The joint element is arranged between the liquid container and the liquid absorbing element.

According to one embodiment, the joint element is made of an elastic material.

According to one embodiment, the cartridge further includes holding element. The upper end of the holding element is sleeved on the bottom of the liquid container. The lower end of the holding element is provided with an aperture. The liquid absorbing assembly is inserted into the holding element from the aperture.

A battery assembly includes an housing and a heater. An insulating element and a power supply unit are accommodated within the housing. The power supply unit comprises a circuit board and a battery. The insulating element is arranged between the housing and the power supply unit. The heater has one or more openings and is electrically connected to the circuit board extending through the insulating element. The battery is arranged below the circuit board.

According to one embodiment, the heater comprises a heating element and a plurality of electrical clamps. One end of the electrical clamp is clamped on the heating element. The other end of the electrical clamp is connected to the circuit board.

According to one embodiment, the heater is clamped on the circuit board using two clamps. One end of the clamp is clamped on the heater, the other end of the clamp is connected to the circuit board.

According to one embodiment, the heater is formed of aluminum nitride.

An electronic cigarette has a cartridge and a battery assembly electrically connected to the cartridge. The cartridge includes a liquid absorbing assembly, and a liquid container for supplying tobacco liquid to the liquid absorbing element. The liquid absorbing element is arranged below the liquid container. The liquid absorbing assembly is arranged in such a manner that the tobacco liquid is kept in the liquid container or the liquid absorbing element before the cartridge is assembled at an in-use state.

BRIEF DESCRIPTION OF DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIG. 6A is a structural view of a cartridge with a heater according to a sixth embodiment of the present disclosure;

FIG. 6B is a structural view of a heat transferring element according to the sixth embodiment of the present disclosure;

FIG. 7A is a perspective view of a cartridge according to a seventh embodiment of the present disclosure;

FIG. 7B is a side view of the cartridge shown in FIG. 7A;

FIG. 7C is a cross-sectional view along F-F line of FIG. 7B;

FIG. 8D is a schematic view of the cartridge FIG. 8A;

FIG. 8E is a side view of the cartridge of FIG. 8A;

FIG. 8F is a cross-sectional view along H-H line of FIG. 8E;

FIG. 8G is a perspective view of the holding element show in FIG. 8F;

FIG. 8H is cross-sectional view of the holding element show in FIG. 8F;

DESCRIPTION OF EMBODIMENTS

Figures 1A, 1B:
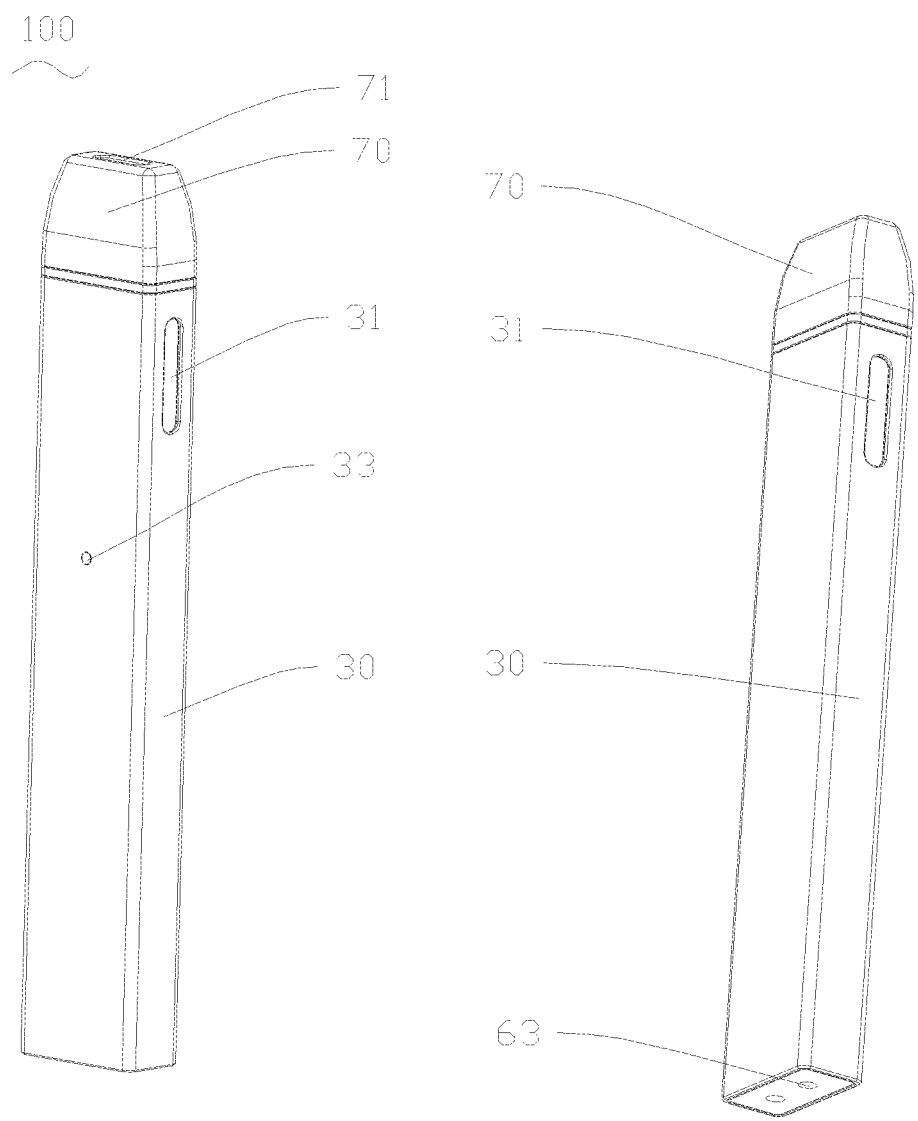
FIG. 1A is a perspective view of an electronic cigarette according to a first embodiment of the present disclosure.
FIG. 1B is another perspective view of an electronic cigarette according to the first embodiment of the present disclosure.
Figures 1C, 1D:
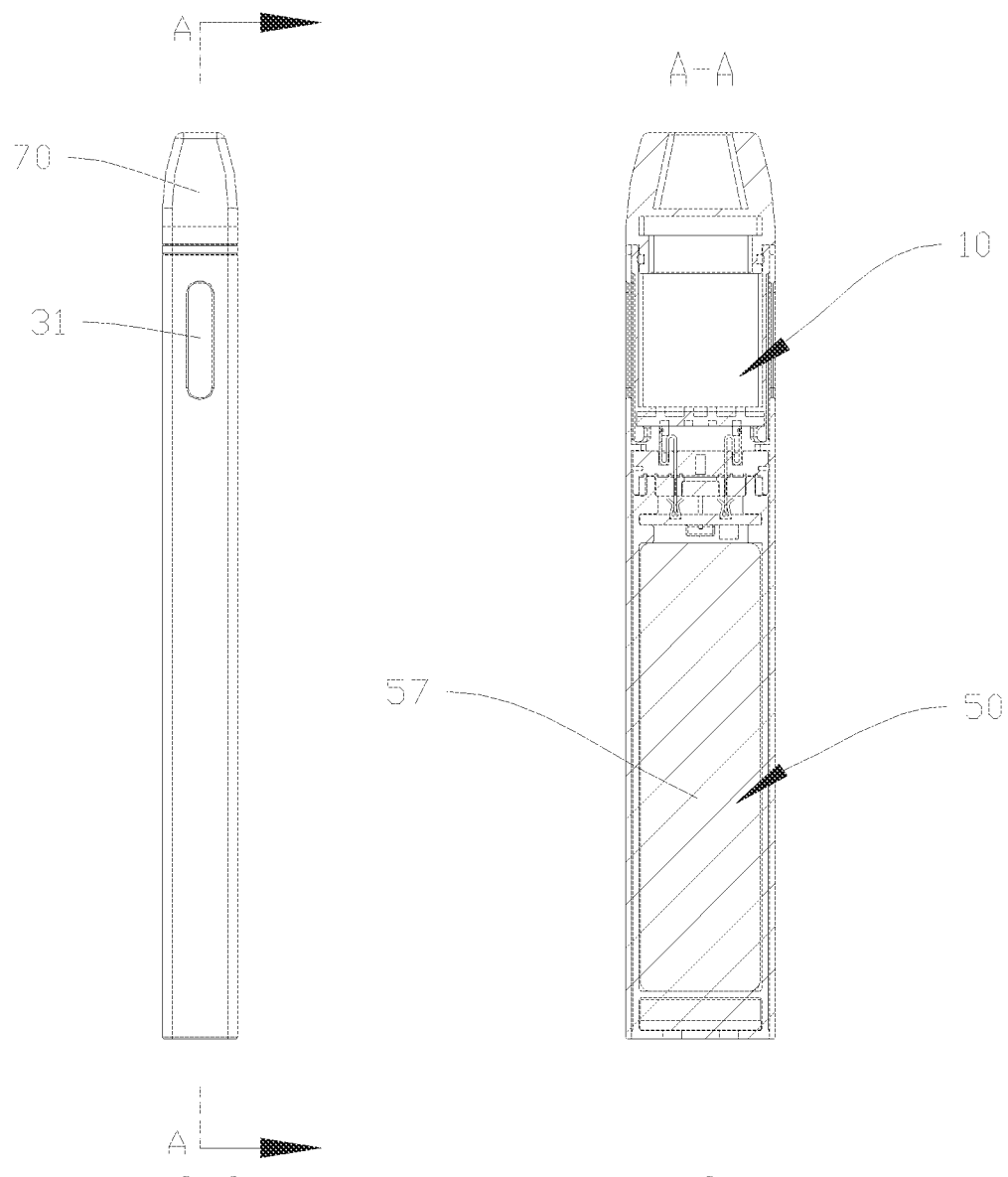
FIG. 1C is a side view of the electronic cigarette of FIG. 1A.
FIG. 1D is a cross-sectional view along A-A line of FIG. 1C.
Figures 1E, 1F:
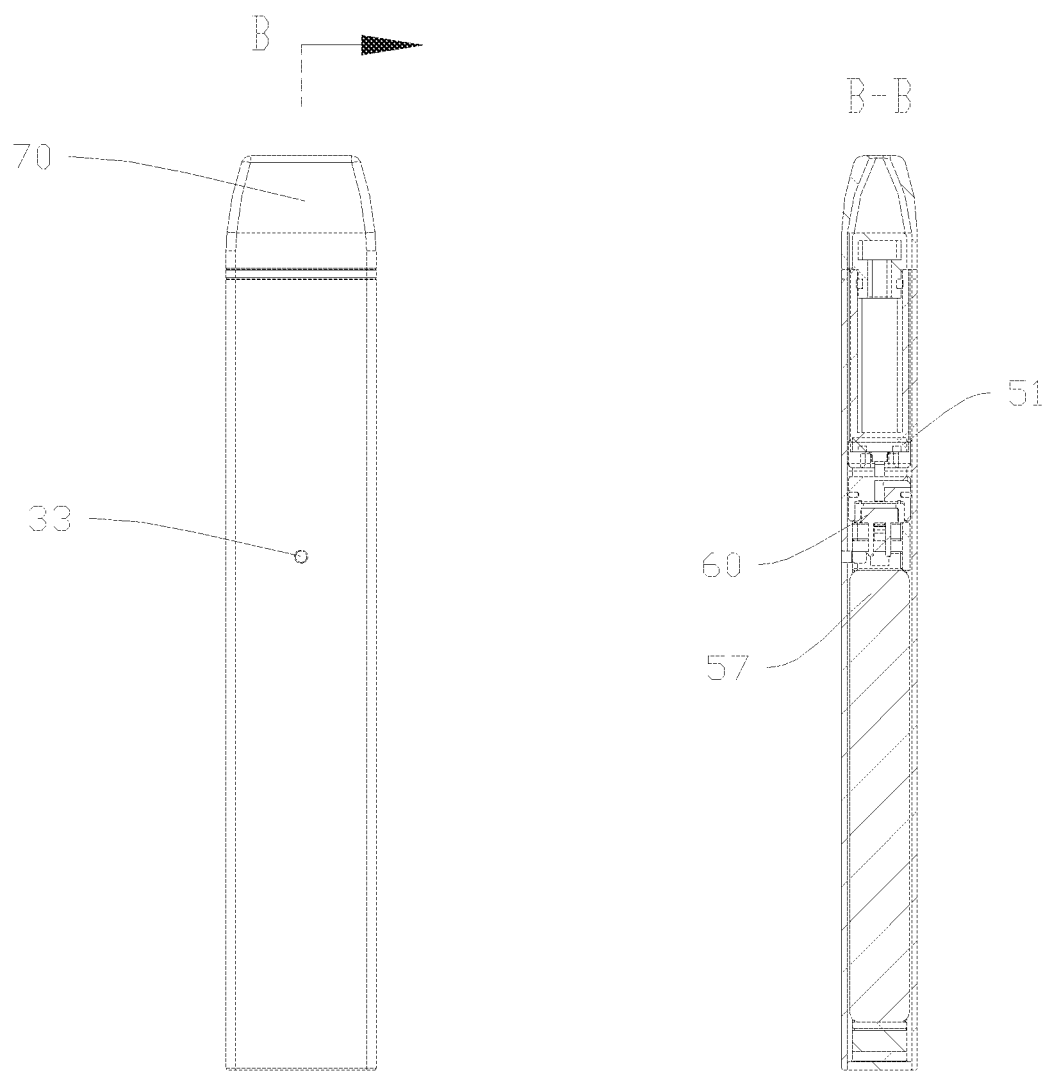
FIG. 1E is a front view of the electronic cigarette of FIG. 1A.
FIG. 1F is a cross-sectional view along B-B line of FIG. 1E.

The technical solution of the present disclosure is hereinafter described in detail with reference to the accompanying drawings. It is evident that the embodiments are only some exemplary embodiments of the present disclosure, and the present disclosure is not limited to such embodiments. Other embodiments that those skilled in the art obtain based on embodiments of the present disclosure also all within the protection scope of the present disclosure.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the present embodiment may obviate one or more of the above-mentioned desires, it should be understood that some aspects of the embodiment might not necessarily obviate them.

The First Embodiment

Referring to FIGS. 1A-1F, the present disclosure of the first embodiment provides an electronic cigarette 100. The electronic cigarette 100 includes a cartridge 10, a housing 30 and a battery assembly 50, and the battery assembly 50 is located within the housing 30. The cartridge 10 is at least partially disposed within the housing 30.

In the embodiment, the cartridge 10 is removably attached to the battery assembly 50 to facilitate user to replace the cartridge 10. The cartridge 10 is a disposable cartridge. It is understood, in alternative embodiments (not shown), the cartridge 10 is reusable.

The electronic cigarette 100 further includes a mouthpiece 70 located on and attached to the cartridge 10. The mouthpiece 70 is a part of the cartridge 10. Besides, the mouthpiece 70 may be exposed when the cartridge 10 is inserted into the housing 30. It is understood, in alternative embodiments (not shown), the mouthpiece 70 is a separate piece detachably mounted on the cartridge 10.

An air inlet 31 is defined on a sidewall of the housing 30, through which air enters the electronic cigarette 100. The mouthpiece 70 is provided with an air outlet 71 in fluid communication with the inside of the electronic cigarette 100. Vapor formed by the electronic cigarette 100 is released from the air outlet 71 for a user to inhale. In the embodiment, two air inlets 31 are respectively located on two opposite sidewalls of the housing 30.

The Cartridge

As has been described in the related art, one deficiency of the conventional electronic cigarette is that the atomizing assembly cannot be reused when the old cartridge should be replaced. Therefore, the present disclosure provides a removable cartridge which can be replaced without changing the other part of the electronic cigarette. Different from the prior cartridge, the removable cartridge in the present disclosure does not contain a heater for heating liquid in the cartridge into vapor. In this way, when the liquid is used up, the removable cartridge can be replaced by a new one and the remaining part of the electronic cigarette can still be reused.

As shown in FIGS. 1G-1M, the cartridge 10 includes a cartridge shell 11, a liquid container 13 received within the cartridge shell 11 and a liquid absorbing assembly 15 located at the bottom of the cartridge shell 11.

The liquid absorbing assembly 15 is arranged in such a manner that the tobacco liquid is kept in the liquid container 13 or the liquid absorbing assembly 15 before the cartridge 10 is assembled at an in-use state. When a cartridge 10 is assembled at the in-use state, it means that the user can use the electronic cigarette 100 normally, i.e., when the user can enjoy the vapor when sucking on the mouthpiece 70.

The liquid absorbing assembly 15 is arranged below the liquid container 13, in other words, the cartridge 10 has a liquid absorbing assembly 15 at its bottom. The liquid container 13 is in fluid communication with the liquid absorbing assembly 15 and configured for supplying tobacco liquid to the liquid absorbing assembly 15. The bottom of the cartridge 10 defines one or more outflow pathways 101 which communicates between the liquid container 13 and the liquid absorbing assembly 15, so that liquid passing through the outflow pathways 101 is exposed on and absorbed by the liquid absorbing assembly 15. In the embodiment, the outflow pathways 101 are not filled with liquid absorbing assembly 15. It is understood, in alternative embodiments (not shown), the outflow pathways 101 are filled with liquid absorbing assembly 15.

The liquid container 21 may hold a gel, tobacco liquid, solids, etc., which is not limited herein. The tobacco liquid will be used as an example in the present disclosure.

In the embodiment, the interior of the cartridge shell 11 is hollow to form the liquid container 13. It is understood, in alternative embodiments (not shown), the liquid container 13 having a hollow structure for containing liquid received within the cartridge shell 11, and one or more liquid flow channels are defined at the bottom of the liquid container 13, and in fluid communication with the outflow pathways 101.

The liquid absorbing assembly 15 is made of absorbable materials so as to absorb the tobacco liquid therein, for example, the liquid absorbing assembly 15 may be a wick which made of cotton, liquid-absorbing ceramics or fiber.

Figures 1G, 1H:
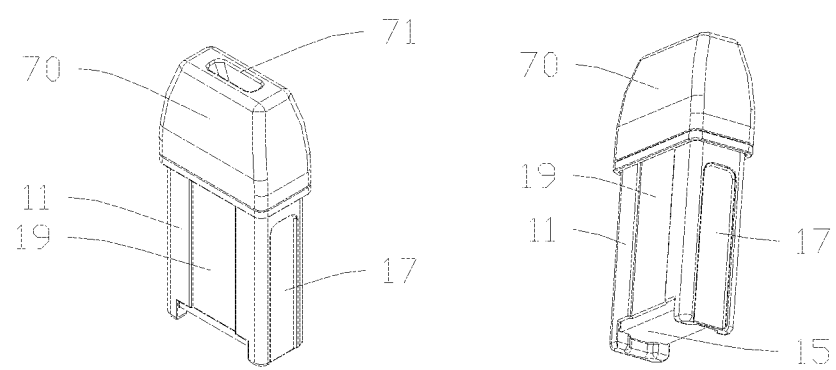
FIG. 1G is a perspective view of the cartridge of the electronic cigarette of FIG. 1A.
FIG. 1H is another perspective view of the cartridge according of the electronic cigarette of FIG. 1A.
Figure 1I:
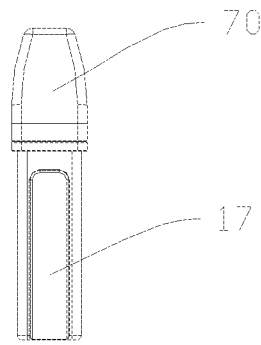
FIG. 1I is a side view of the cartridge of FIG. 1G.
Figure 1J:
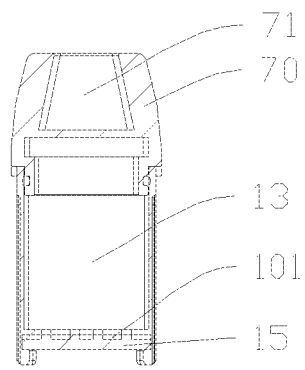
FIG. 1J is a cross-sectional view along C-C line of FIG. 1I.

Referring to FIG. 1G and FIG. 1H, the cartridge 10 further defines first grooves 17 on its side walls, and second grooves 19 on its front wall and back wall. In this embodiment, the first grooves 17 and the second grooves 19 are defined on the outer surfaces of the cartridge shell 11. When the cartridge 10 is inserted into the housing 30, the first grooves 17 and the inner walls of the housing 30 cooperatively define inner air channels (not labeled) which fluidly communicate with the an air inlet 31, and the second grooves 19 and the inner walls of the housing 30 cooperatively define outlet air channels (not labeled) which fluidly communicate with the an air outlet 71 of the mouthpiece 70. Each of the second grooves 19 extends upward to communicate with the air outlet 71 on the mouthpiece 70. In the embodiment, the second grooves 19 curves upward and inward toward respectively, much like a cathedral ceiling, eventually leading to the air outlet 71 on the mouthpiece 70.

In other contemplated embodiments, channels/passage for air travel can be anywhere on the electronic cigarette 100 and not limited to the side walls and front/back wall of the cartridge 10.

Figure 1K:
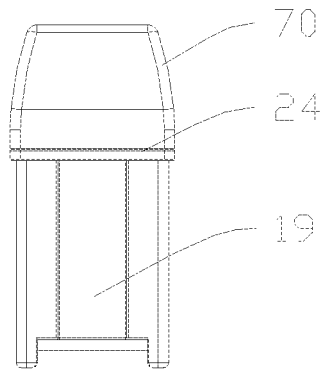
FIG. 1K is a front view of the cartridge of FIG. 1G.
Figure 1L:
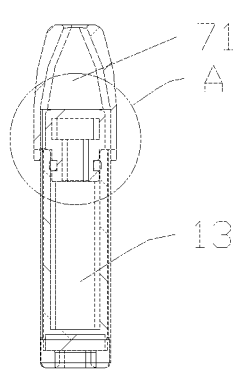
FIG. 1L is a cross-sectional view along B-B line of FIG. 1K.
Figure 1M:
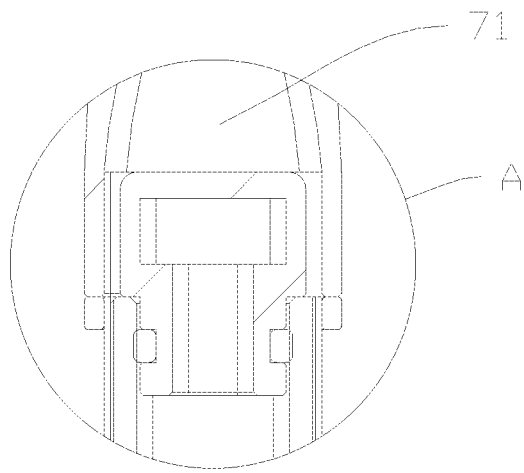
FIG. 1M is an enlarged view of section A in FIG. 1L.
Figures 1N, 1O:
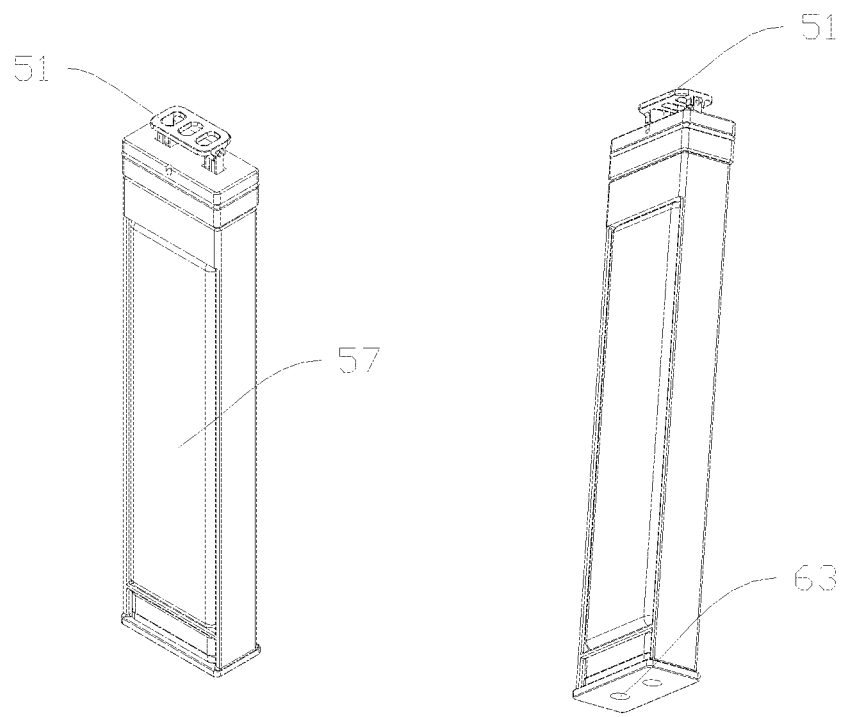
FIG. 1N is a perspective view of the battery assembly of FIG. 1A.
FIG. 1O is another perspective view of the battery assembly of FIG. 1A.
Figure 1P:
FIG. 1P is a side view of the battery assembly of FIG. 1A.
Figure 1P:
Figure 1Q:
FIG. 1Q is a cross-sectional view along E-E line of FIG. 1P.
Figure 1Q:
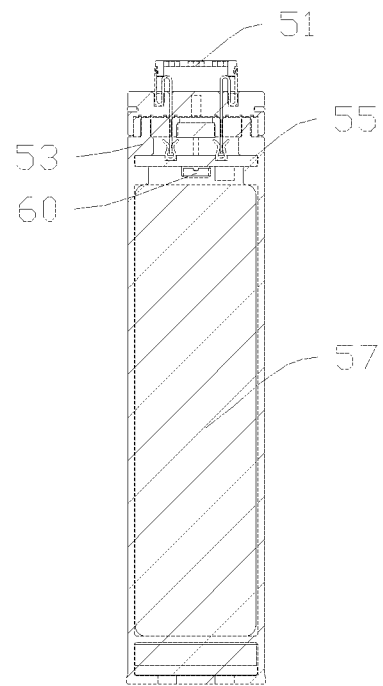

Referring to FIG. 1K, the cartridge 10 further includes a first sealing member 24, which serves to seal air in the outlet air channels cooperatively formed by the second grooves 19 and the inner walls of the housing 30, so as to improve the utilization of the vapor generated by the electronic cigarette 100.

The Battery Assembly

Referring to FIGS. 1N-1Q, the battery assembly 50 includes a heater 51, an insulating element 53 and a power supply unit, the power supply unit includes a circuit board 55 and a battery 57 electrically connected with the circuit board 55 and the heater 51.

The insulating element 53 is disposed between the heater 51 and the circuit board 55. The battery assembly 50 further includes two leads 513 attaching the heater 51 to the circuit board 55. Specifically, one end of the leads 513 is attached to the heater 51, the opposite end of the leads 513 is extending through the insulating element 53 and attached to the circuit board 55.

Figure 1R:
FIG. 1R is a perspective view of the heater shown in FIG. 1N.
Figure 1R:
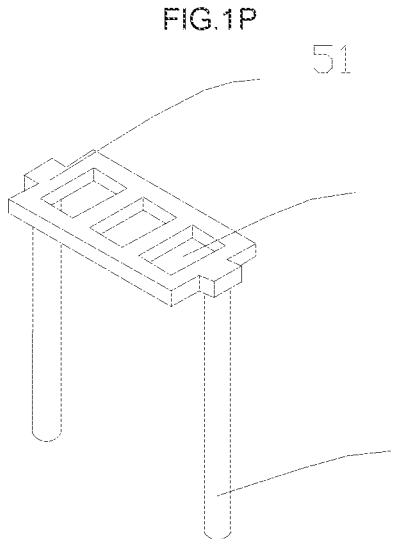

Referring to FIG. 1R, in the embodiment, the leads 513 is soldered on the circuit board 55.

Figure 1S:
FIG. 1S is a perspective view of another embodiment of the heater in FIG. 1N.
Figure 1S:
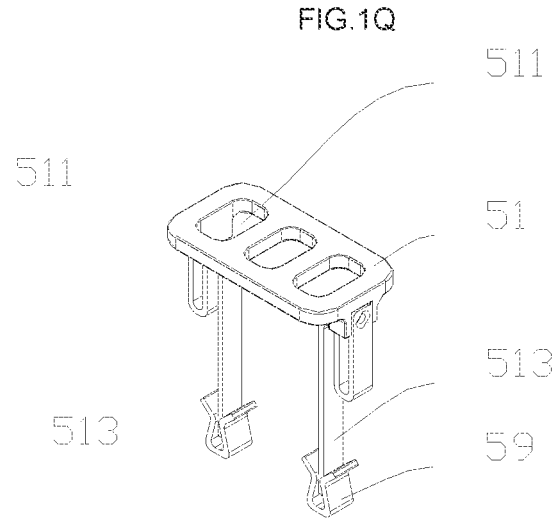
Figures 1T, 1U:
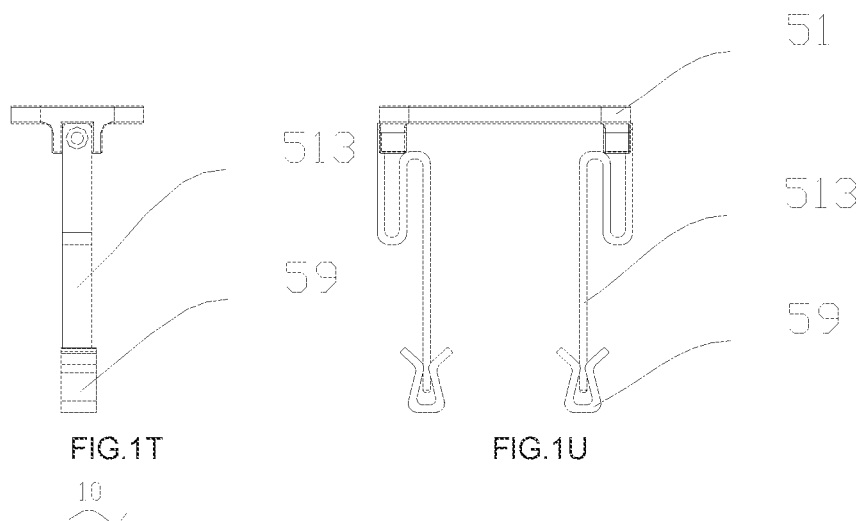
FIG. 1T is a side view of the heater in FIG. 1S.
FIG. 1U is a front view of the heater shown in FIG. 1S.

Referring to FIGS. 1S, 1T and 1U, in another embodiment, the heater 51 is "clamped" on the circuit board 55 using two clamps 59 to facilitate user to replace the heater 51. With respect to each clamp 59, one end of the clamps 59 is clamped on the heater 51, the other end of the clamps 59 is connected to the circuit board 55. Specifically, the heater 51 has two leads 513 located on its opposite ends, and each of the clamp 59 can then be clamped on one of the leads 513 respectively.

Since the clamps 59 are conductive, the heater 51 begins heating the liquid absorbing assembly 15 of the cartridge 10 once the battery assembly 50 is turned on. In an embodiment, combinations of nut and bolt (not shown) may be arranged between the heater 51 and the clamp 59 to further fasten the heater 51. Surely, other combinations may be used instead of the nut and bolt as long as they can affix the heater 51.

It should be noted that the clamps 59 are not only configured to hold the heater 51 but also to serve as electrical leads between the heater 51 and the circuit board 55. In other words, they may also function as the electrical leads in the soldering manner. Therefore, similarly, the number of the clamps 59 can also be changed according to actual requirements.

The heater 51 is a solid-state heater, the heater 51 is made of ceramic, metal, or metal-ceramic complex (such as ceramic embedded with metal inside, and so on). In the embodiment, the heater 51 is made of AlN ceramic containing trace amounts of tungsten. In other embodiment, tungsten is embedded in the AlN ceramic.

The heater 51 defines one or more openings 511 so that when its top surface touches the liquid absorbing assembly 15, there can be sufficient openings for vapor to escape. The number of the openings 511 is not limited herein. In the embodiment, the openings 511 extend through the heater 51.

When the cartridge 10 is inserted into place, the liquid absorbing assembly 15 is in close proximity, or makes direct contact, with a heater 51. In one embodiment, since the liquid absorbing assembly 15 is made of deformable material such as cotton, the liquid absorbing assembly 15 will be deformed and partially accommodated in the openings 511 under the action of an external force, so that the contact surface area between the heater 51 and the liquid absorbing assembly 15 can be improved.

The cartridge 10 also has a sealing element (not shown) which covers a liquid absorbing assembly 15 inside/outside of the cartridge 10. The sealing element is generally sleeved on a bottom of the cartridge 10 for preventing the liquid from leaking out of the cartridge 10 before being used. As long as the sealing element can seal the bottom of the cartridge, its material, size, and form are not limited herein.

The battery assembly 50 further includes a sensor 60. In this embodiment, a sensor 60 is arranged near the heater 51 in the insulating element 53. There can be a channel (not shown) allowing fluid communication of air between where the sensor 60 is and a path of airflow (e.g., inlet, outlet, region near the heating element).

The sensor 60 is an airflow sensor. In fact, the sensor 60 can be arranged anywhere in the electronic cigarette 100 to detect air pressure changes as a user sucks on the mouthpiece 70. This pressure change automatically turns on the heater 51. This eliminates the need for an ON/OFF button for a user to press (to turn on the heater). The sensor 60 should be in fluid communication with the region where air moves as a result of a user sucking on the mouthpiece 70.

In another embodiment, the sensor 60 is located below the battery 57, and the electronic cigarette 100 further includes an air inlet channel (not shown) connecting with the sensor 60 and the mouthpiece 70, the sensor 60 is located in the air inlet channel. Outside air enters the electronic cigarette 100 and passes through the air inlet channel and the mouthpiece 70 successively, such that the sensor 60 can detect the air pressure changes as user sucks on the mouthpiece 70.

Based on the above structure, when a user sucks on the mouthpiece 70, outside air enters, passes through the air inlet 31 of the housing 30 and travels down the inner air channels, eventually reaches a region underneath the heater 51. The sensor 60 then detects the air pressure change and turns on the heater 51 of the battery assembly 50, and the heater 51 thus begins heating the exposed liquid absorbing assembly 15, thereby vaporizing the tobacco liquid thereon. The vapor then travels up in the outlet air channels into the mouthpiece 70. It should be noted that the outlet air channels and the inner air channels described herein are for illustrative purposes, in an embodiment, passage for air travel can be anywhere between the cartridge 10 and the housing 30 and not limited to the side walls and front/back wall of the cartridge 10.

In an embodiment, a front surface of the housing 30 is provided with a light indicator 33 which can be used to signal one or more things. For example, it may be an in-use indicator configured to indicate the ON or OFF state of the electronic cigarette 100, or that of a heater 51 arranged within the housing 30, or it may also be a battery low indicator configured to remind the user to charge/replace a battery in the battery assembly 50. It should be noted that the function of the light indicator 33 is not limited herein and can be varied according to actual requirements.

In this embodiment, the battery assembly 50 is rechargeable. As can be seen from FIG. 1B, two charging contacts 63 are arranged on the bottom of the battery assembly 50. These charging contacts 63 are configured to charge the battery assembly 50. It should be noted that the positions of the charging contacts 63 in the figure are only for illustrative purposes In use, when the cartridge 10 is inserted into the housing 30, only the mouthpiece 70 is exposed as shown in FIG. 1. When a user sucks on the mouthpiece 70, outside air enters pass through the air inlet 31 and travels down the inner air channels and the openings 511, eventually reaching the region right underneath the exposed liquid absorbing assembly 15 (the entire bottom side of the cartridge 10 in FIG. 1H is the exposed and moist wick). The heater 51 is turned on by the sensor 60, thus begins heating the liquid absorbing assembly 15 thereby vaporizing liquid on the liquid absorbing assembly 15. The vapor then travels up the outlet air channels of the cartridge 10 into the mouthpiece 70.

The cartridge 10 is replaceable and removable. When a user removes the cartridge 10 by simply pulling the mouthpiece 70 upwards, the entire cartridge 10 becomes separated from the battery assembly 50. Once the cartridge 10 is removed, the heater 51 exposed at the top of the battery assembly 50 (see FIG. 1N), that is the heater 51 does not need to be replaced together with the cartridge 10 so as to reduce the replacement cost.

Although the drawings show a generally linear configuration of mouthpiece 70 on top of liquid container 13, which has a liquid absorbing assembly 15 at its bottom adapted for touching the heater 51, which is on top of a battery assembly 50, it should be especially noted that any other spatial arrangements are possible as long as the same concept is utilized. One of the intended goals is to have a cartridge 10 pre-filled with liquid within its liquid container 13, wherein the liquid container 13 is connected to the liquid absorbing assembly 15 that is exposed for contact with a heating element. This cartridge 10 then can produce vapor with different flavors and nicotine levels, or other additives.

It is understood, in alternative embodiments (not shown), the arrangement of the element of the battery assembly 50 can be varied according to actual requirements. For example, the battery assembly 50 includes a battery part and an atomizing part removable attached to the battery part. The battery part includes the power supply unit which including the circuit board 55 and the battery 57. The atomizing part includes the heater 51 and the insulating element 53. The sensor 60 is located on the battery part or the atomizing part.

It should be noted that the function of the light indicator 33 is not limited herein and can be varied according to actual requirements.

One problem with removable cartridge may be that, when the cartridge is inserted into place, a liquid absorbing element which is normally arranged within the cartridge becomes in close proximity, or make direct contact, with a heater which can be part of the battery assembly. The tobacco liquid in the liquid absorbing element may thus leak out due to the pressure. In order to solve this problem, the present disclosure provides several implementations of the cartridge as described in the following.

The Second Embodiment

Figures 2A, 2B:
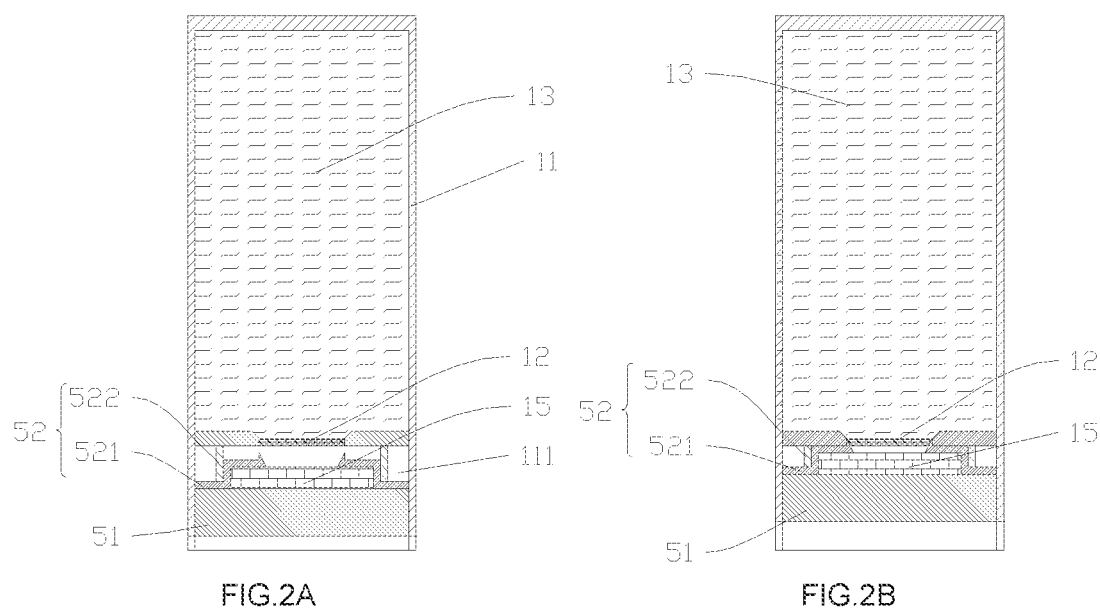
FIG. 2A is a structural view of a cartridge with a heater in a non-use state according to a second embodiment of the present disclosure.
FIG. 2B is a structural view of the cartridge with a heater in an in-use state according to the second embodiment of the present disclosure.

Referring to FIGS. 2A-2B, the present disclosure of the second embodiment provides a cartridge 10. The cartridge 10 includes a cartridge shell 11, a liquid absorbing assembly 15, a membrane 12, a puncturing unit 52 and a heater 51. The cartridge shell 11 has a hollow structure defines a chamber 111 at its lower part. The liquid absorbing assembly 15, the membrane 12 and the heater 51 are removably located within the chamber 111. The membrane 12 is arranged on the bottom of the liquid container 13, and the puncturing unit 52 is arranged with a predefined distance below the membrane 12. In the embodiment, the membrane 12 is a liquid isolating membrane configured for sealing the liquid within the liquid container 13. The puncturing unit 52 includes a puncturing element 521 and an elastic element 522. One end of the puncturing element 521 is attached to the heater 51, and the opposite end of the puncturing element 521 is protruded above the liquid absorbing assembly 15. The elastic element 522 is elastically compressively disposed between the puncturing element 521 and the bottom of the liquid container 13. One end of the elastic element 522 abuts against the puncturing element 521 and the other end of the elastic element 522 abuts against the bottom of the liquid container 13. The puncturing element 521 has a sharp end whose shape matches with a corresponding end of the membrane 12, so that the sharp end is engaged with the corresponding end of the membrane 12 when moving up to the membrane 12. Surely, the shape of the sharp end is not limited herein to the present disclosure.

When the cartridge 10 is in a non-use state as shown in FIG. 2A (i.e., before the cartridge 10 is inserted into the in-use state), the membrane 12 seals the tobacco liquid in the liquid container 13, and the elastic element 522 expands so that the puncturing element 260 is at a predefined distance below the membrane 12. When the cartridge 10 is inserted into the in-use state, the elastic elements 522 contracts due to the external force, and the cartridge 10 therefore goes into an in-use state as shown in FIG. 2B. The sharp end of the puncturing element 521 thrusts its way through the membrane 12, thus form holes for the tobacco liquid held in the liquid container 13 to pass downwards into the liquid absorbing assembly 15, and then contacts with the heater 51. Once the heater 51 is turned on, the tobacco liquid held in the liquid absorbing assembly 15 may be heated into vapor for the user to enjoy.

It is understood, in alternative embodiments (not shown), the heater 51 is a separate element of the cartridge 10, that is, the heater 51 is not a part of the cartridge 10. The puncturing element 521 is attached to the cartridge shell 11 or the liquid absorbing assembly 15, and the elastic element 522 is elastically compressively disposed between the liquid absorbing assembly 15 and the bottom of the liquid container 13.

It is understood, in alternative embodiments (not shown), the elastic element 522 can be omitted, such as using two or more limiting grooves to limit the motion of the puncturing element 521.

The membrane 12 can be formed of soft materials with good sealing performance.

Besides, it should be noted that the distance between the membrane 12 and the puncturing element 521, the width of the membrane 12, the shape and the number of the puncturing element 521 are only for illustrative purposes, which can be changed according to actual requirements.

The Third Embodiment

Figures 3A, 3B:
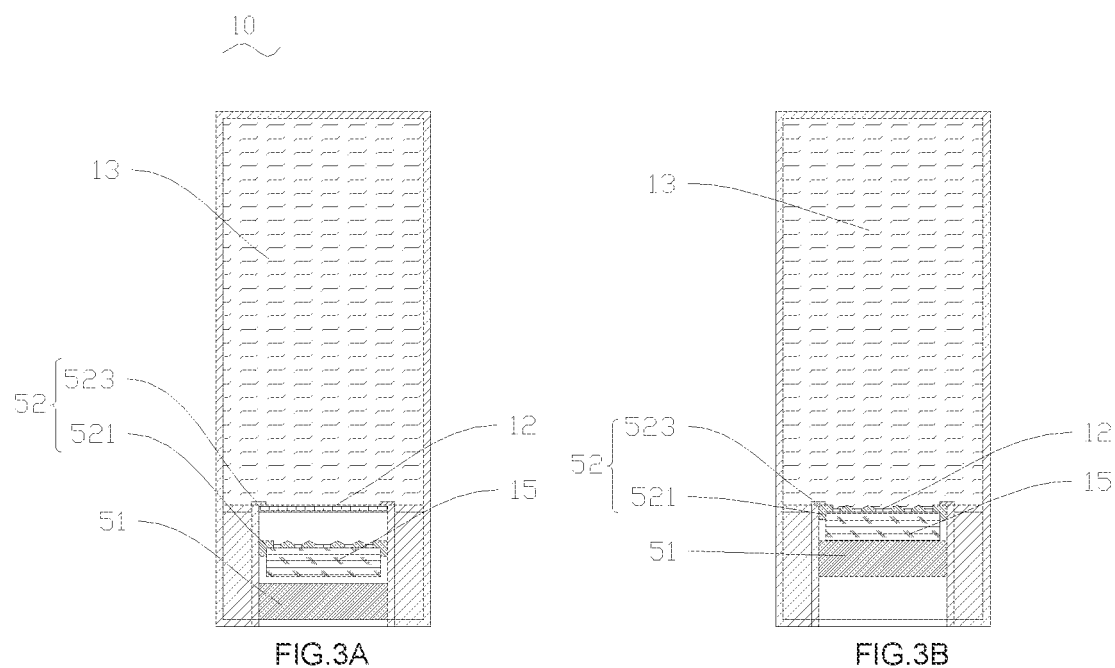
FIG. 3A is a structural view of a cartridge with a heater in a non-use state according to a third embodiment of the present disclosure.
FIG. 3B is a structural view of the cartridge with a heater in an in-use state according to the third embodiment of the present disclosure.

Referring to FIGS. 3A-3B, the present disclosure of the third embodiment provides a cartridge 10 having another kind of puncturing unit 52 different from the puncturing unit 52 of the second embodiment. The puncturing unit 52 includes two limiters 523 and a plurality of puncturing elements 521. The two limiters 523 are respectively arranged on two ends of the membrane 12. The limiter 23 serves to prevent the puncturing elements 521 from moving into the liquid container 13 when suffering from the external force.

Similarly, when the cartridge 10 is in a non-use state as shown in FIG. 3A (i.e., before the cartridge 10 is inserted into the in-use state), the membrane 12 seals the tobacco liquid in the liquid container 13, and the puncturing elements 521 stay at a predefined distance below the membrane 12. When the cartridge 10 is inserted into the in-use state, the puncturing elements 521 move up due to the external force and the cartridge 10, therefore, goes into an in-use state as shown in FIG. 3B. The sharp end of the puncturing elements 521 thrust their ways through the membrane 12, thus form small holes for the tobacco liquid held in the liquid container 13 to follow downwards into the liquid absorbing assembly 15, and then contacts with the heater 51. Once the heater 51 is turned on, the tobacco liquid held in the liquid absorbing assembly 15 may be heated into vapor for the user to enjoy.

The Fourth Embodiment

Figures 4A, 4B:
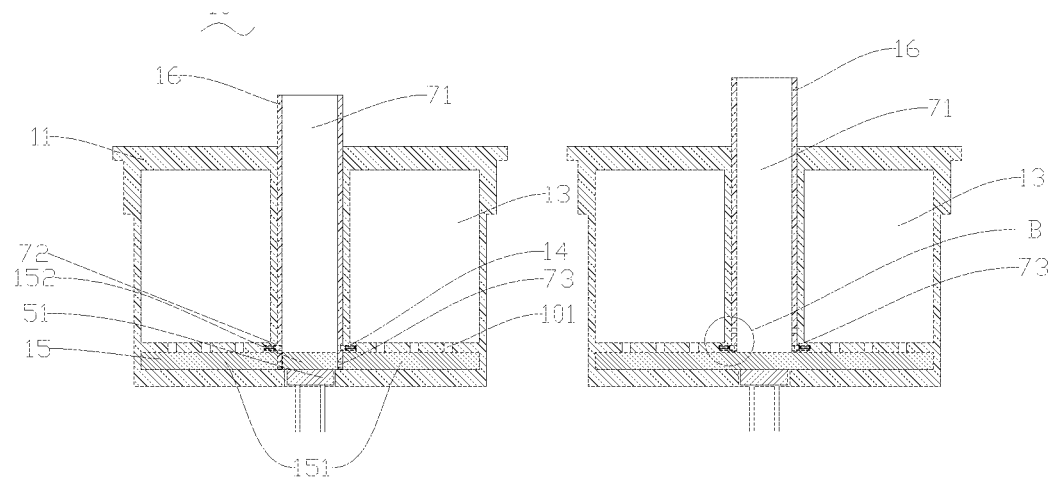
FIG. 4A is a structural view of a cartridge with a heater in a non-use state according to a fourth embodiment of the present disclosure.
FIG. 4B is a structural view of a cartridge with a heater in an in-use state according to the fourth embodiment of the present disclosure.
Figure 4C:
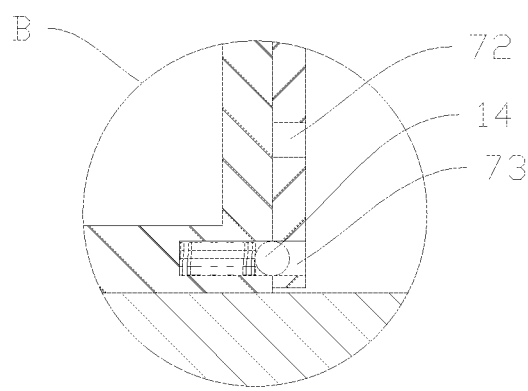
FIG. 4C is an enlarged view of the portion B shows in FIG. 4B.

Referring to FIGS. 4A-4C, the present disclosure of the third embodiment provides a cartridge 10. The cartridge 10 includes a liquid adjusting element 16, a cartridge shell 11, a liquid container 13 located within the cartridge shell 11, a liquid absorbing assembly 15 located at the bottom of the liquid container 13, and a heater 51 arranged below the liquid absorbing assembly 15. The liquid absorbing assembly 15 is partially in contact with the heater 51. The liquid adjusting element 16 is removably attached to the cartridge shell 11.

The hollow interior of the cartridge shell 11 forms the liquid container 13. The liquid absorbing assembly 15 is located at the bottom of the liquid container 13. The liquid container 13 defines one or more outflow pathways 101, which communicate between the liquid container 13 and the liquid absorbing assembly 15. The liquid absorbing assembly 15 includes a first absorbing assembly 151 and a second absorbing assembly 152 separated from the first absorbing assembly 151 by the liquid adjusting element 16, when the liquid adjusting element 16 is assembled at a non-use state. The first absorbing assembly 151 and the second absorbing assembly 152 can be fluidly communicate with each other by moving the liquid adjusting element 16. That is, the liquid adjusting element 16 is movably disposed between the first absorbing assembly 151 and the second absorbing assembly 152.

In the embodiment, the liquid adjusting element 16 is a mouthpiece. The mouthpiece has a hollow cylinder structure. One part of the liquid adjusting element 16 is arranged within the cartridge shell 11. The liquid adjusting element 16 is provided with an upper positioning slot 72, a lower positioning slot 73 and a positioning element 14. The upper positioning slot 72 is arranged in parallel to a bottom surface of the liquid container 13, and the lower positioning slot 73 is arranged on the bottom of the liquid adjusting element 16. A bottom surface of the liquid container 13 in contact with the part of the liquid absorbing assembly 15 is provided with the outflow pathways 101. These outflow pathways 101 is formed as liquid flow channels for the tobacco liquid held in the liquid container 13 to permeate the liquid absorbing assembly 15 downwards. In an embodiment, the liquid outlet is filled with a wick. The liquid adjusting element 16 also has an air outlet 71 similar to the air outlet 71 in FIG. 1A.

The positioning element 14 serves to cooperate with the two positioning slots to maintain the liquid adjusting element 16 in preset positions. For example, the positioning element 14 may include a spring and a ball. In the following, the spring and the ball will be used as an example to describe the structure of the cartridge 10 before and after being assembled.

As shown in FIG. 4A, when the cartridge 10 is in a non-use state, the upper positioning slot 72 cooperates with the positioning element 14, where the ball is pushed by the spring into the upper positioning slot 72 so as to maintain the liquid adjusting element 16 at a relatively lower position. At this time, the lower end of the liquid adjusting element 16 abuts against the liquid absorbing assembly 15, thereby dividing the liquid absorbing assembly 15 into two parts including the first absorbing assembly 151 and the second absorbing assembly 152. The second absorbing assembly 152 is located within the bottom of the liquid adjusting element 16, and the first absorbing assembly 151 is located on the outside of the liquid adjusting element 16. The heater 51 is arranged below the second absorbing assembly 152. Although the tobacco liquid may flow into the first absorbing assembly 151 through outflow pathways 101 provided on the bottom surface of the liquid container 13, since the heater 51 only contacts the second absorbing assembly 152, only the second absorbing assembly 152 is exposed the external force when inserting the cartridge 10 into the in-use state.

When inserting the cartridge 10 into the in-use state, the liquid adjusting element 16 is pulled upwards until the lower positioning slot 73 arrives at the position where the ball is located, then the ball goes into the lower positioning slot 73, thereby maintaining the liquid adjusting element 16 at a relatively higher position. At this time, since the lower end of the liquid adjusting element 16 no longer abuts the liquid absorbing assembly 15, the first absorbing assembly 151 rebound, thus enabling the tobacco liquid in the first absorbing assembly 151 to flow into the second absorbing assembly 152. Once the heater 51 is turned on, the tobacco liquid held in the liquid absorbing assembly 15 may be heated into vapor for the user to enjoy.

It should be noted that the lengths of the two parts of the liquid absorbing assembly 15 are not limited herein and can be changed according to actual requirements.

The Fifth Embodiment

Referring to FIGS. 5A-5E, the present disclosure of the fifth embodiment provides a cartridge 10. The cartridge 10 includes a liquid adjusting element 16, a cartridge shell 11, a liquid container 13 located within the cartridge shell 11, a liquid absorbing assembly 15, and a heater 51 arranged below the liquid absorbing assembly 15. The liquid absorbing assembly 15 is partially in contact with the heater 51. The liquid adjusting element 16 is rotatably disposed between the cartridge shell 11 and the liquid absorbing assembly 15.

The bottom surface of the liquid container 13 is provided with a plurality of outflow pathways 101. The liquid adjusting element 16 is provided with a plurality of liquid adjusting outlets 161 arranged in positions corresponding to positions of the plurality of outflow pathways 101. These outflow pathways 101 form liquid flow channels for the tobacco liquid held in the liquid container 13 to permeate the liquid absorbing assembly 15 downwards. In an embodiment, the outflow pathways 101 are filled with the liquid absorbing assembly 15 such as a wick.

Figures 5A, 5B:
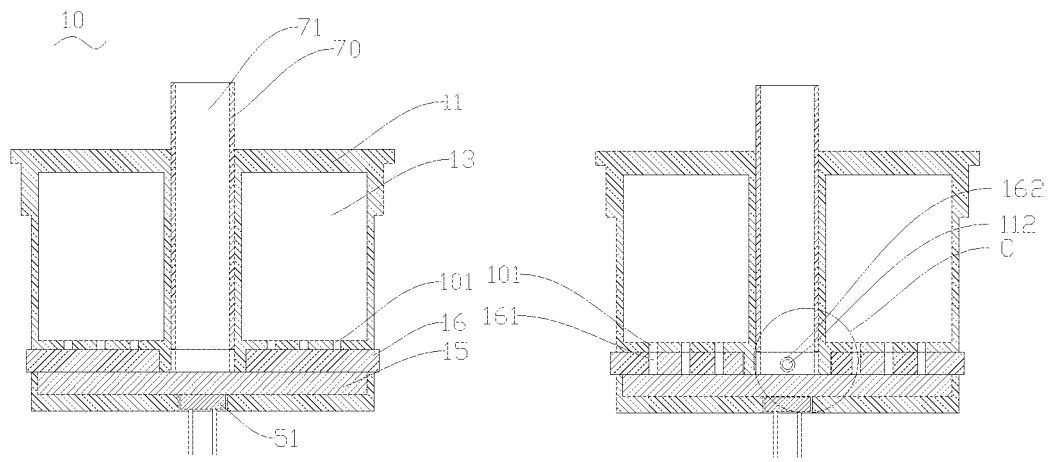
FIG. 5A is a structural view of a cartridge with a heater in a non-use state according to a fifth embodiment of the present disclosure.
FIG. 5B is a structural view of a cartridge with a heater in an in-use state according to the fifth embodiment of the present disclosure.
Figures 5C, 5D:
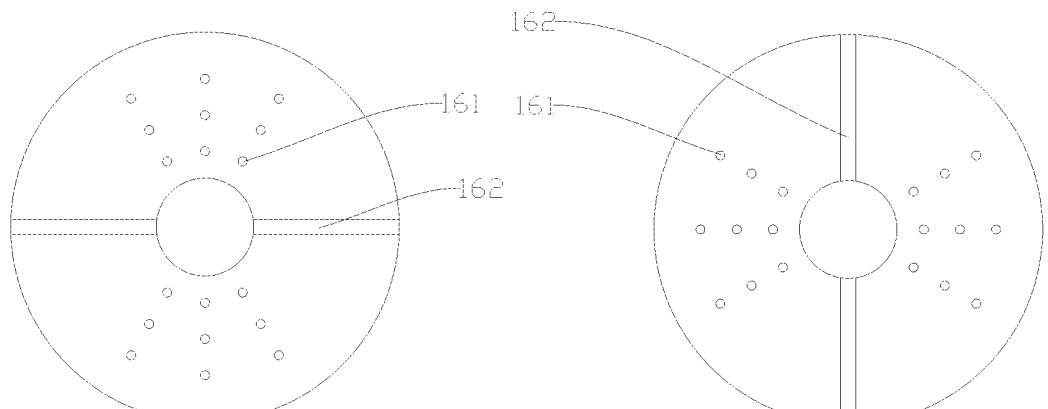
FIG. 5C is a schematic view of the liquid adjusting element in a non-use state shown in FIG. 5A.
FIG. 5D is a schematic view of the liquid adjusting element in an in-use state shown in FIG. 5B.
Figure 5E:
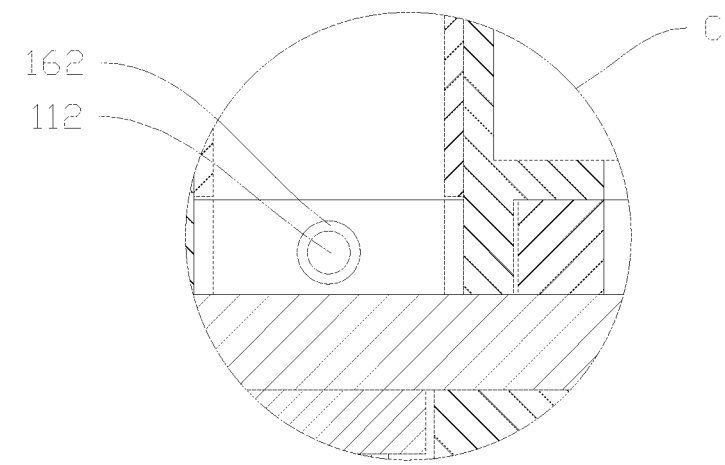
FIG. 5E is an enlarged view of the portion C shown in FIG. 5B.

As shown in FIG. 5A, when the cartridge 10 is in a non-use state, rotating the liquid adjusting element 16 so that the plurality of liquid adjusting outlets 161 are misaligned with the outflow pathways 101, thereby preventing the tobacco liquid in the liquid container 13 from flowing into the liquid absorbing assembly 15 through the liquid adjusting outlets 161. When the cartridge 10 is assembled at the in-use state, as shown in FIG. 5B, rotating the liquid adjusting element 16 so that the plurality of liquid adjusting outlets 161 are aligned with the outflow pathways 101, thereby the tobacco liquid in the liquid container 13 can flow into the liquid absorbing assembly 15 through the liquid adjusting outlets 161.

Optionally, the liquid adjusting element 16 is provided with a first air inlet via 162, and corresponding to the first air inlet via 162, the cartridge 10 is also provided with a second air inlet via 112 on cartridge shell 11, when the cartridge 10 is in a non-use state, as shown in FIG. 5A, the liquid adjusting outlets 161 are misaligned with the outflow pathways 101, and the first air inlet via 162 on the liquid adjusting element 16 is also misaligned with the second air inlet via 112 on the cartridge shell 11; when the cartridge 10 is assembled at the in-use state, as shown in FIG. 5B, the liquid adjusting outlets 161 are aligned with the outflow pathways 101, and the first air inlet via 162 on the liquid adjusting element 16 is also aligned with the second air inlet via 112 of the cartridge 10. Thus preventing outer contaminations from entering into the cartridge 10 and also preventing the tobacco liquid inside the cartridge 10 from leaking out through the second air inlet via 112.

The cartridge 10 further includes a mouthpiece 70 having an air outlet 71.

The Sixth Embodiment

Referring to FIG. 6A, the present disclosure of the sixth embodiment provide a cartridge 10, the cartridge 10 further includes a heat transferring element 18 arranged below the liquid absorbing assembly 15 compared with the first embodiment. In in-use state, the heat transferring element 18 contacts with the heater 51. The upper surface of the heat transferring element 18 is provided with one or more vapor outlets 180. One side of the heat transferring element 18 is provided with an air inlet opening 181, and the other side of the heat transferring element 18 is provided with a vapor outlet opening 182.

The bottom surface of the liquid container 13 is provided with a plurality of outflow pathways 101, these outflow pathways 101 form liquid flow channels for the tobacco liquid held in the liquid container 13 to permeate the liquid absorbing assembly 15 downwards. In an embodiment, the outflow pathways 101 are filled with a liquid absorbing assembly 15 such as a wick.

When the cartridge 10 is assembled at the in-use state, since a lower surface of the heat transferring element 18 is attached to the heater 51, and the heater 51 is not in direct contact with the liquid absorbing assembly 15, so the tobacco liquid would not leak out due to the external force. When the heater 51 is turned on, the heat formed by the heater 51 passes by the lower surface and sides of the heat transferring element 18 and arrives at its upper surface, the upper surface of the heat transferring element 18 then heats the tobacco liquid held in liquid absorbing assembly 15 into vapor, which enters into the inner chamber of the heat transferring element 18 through the vapor outlets 180.

When a user sucks on the mouthpiece 70, outside air passes through the inner air channels and enters into the inner chamber of the heat transferring element 18 through the air inlet opening 181, then mixes with the vapor therein and exhausts through the vapor outlet opening 182, the outlet air channels, and eventually arrives at the mouthpiece 70 for the user to enjoy.

Besides, it should also be noted that the heat transferring element 18 shown in FIG. 6A is a cuboid, so the air and the vapor have to pass through the openings on its sides into the inner chamber. In an embodiment, as shown in FIG. 6B, it may also have a center opening 183, the upper surface of the heat transferring element 18 contacts with the liquid absorbing assembly 15 and is provided with vapor outlets (not shown), the lower surface of the heat transferring element 18 contacts with the heater 51, outside air may pass through its center opening 183, mix with the vapor from the vapor outlets and exhaust through the outlet air channels, and eventually arrive at the mouthpiece 70 for the user to enjoy.

In all the implementations described above, the liquid absorbing assembly 15 is formed of soft materials such as cotton. In an embodiment, it may also be formed of rigid materials so that the tobacco liquid stored therein will not leak out even when suffering from the external force.

The Seventh Embodiment

Referring to FIGS. 7A-7C, the present disclosure of the seventh embodiment provide a cartridge 10, the cartridge 10 includes a cartridge shell 11, a liquid container 13, a liquid absorbing assembly 15 accommodated inside the cartridge shell 11, a supporting element 20, and a joint element 531 arranged between the supporting element 20 and the liquid absorbing assembly 15. The liquid absorbing assembly 15 is made of absorbing ceramic or other kinds of rigid material.

In this embodiment, when the cartridge 10 is assembled on an atomizing assembly/battery assembly having a heater 51, the heater 51 is arranged below the liquid absorbing assembly 15.

The joint element 531 is configured to increase the contact area between the liquid absorbing assembly 15 and the heater 51, when the cartridge 10 is assembled on an atomizing assembly/battery assembly having a heater 51. The joint element 531 is an elastic component, that is, the joint element 531 is made of elastic material.

In the embodiment, the joint element 531 is cotton. With this joint element 531, the liquid container 13 and the liquid absorbing assembly 15 become in close contact, under the external force when the cartridge 10 is assembled at the in-use state.

It is understood, in alternative embodiments (not shown), the joint element 531 is located at one side of the heater 51, to provide an elastic support to increase the contact area between the liquid absorbing assembly 15 and the heater 51.

The bottom surface of the liquid container 13 is provided with one or more outflow pathways 101. These outflow pathways form liquid flow channels for the tobacco liquid held in the liquid container 13 to permeate the liquid absorbing assembly 15 downwards. In an embodiment, the outflow pathways are filled with the liquid absorbing assembly 15 such as a wick.

In an embodiment, the supporting element 20 is arranged between the liquid container 13 and the joint element 531 to support the liquid container 13. In this case, the supporting element 20 is also provided with one or more outflow pathways (not shown) corresponding to the outflow pathways 101 defined on the bottom surface of the liquid container 13, so that the tobacco liquid held in the liquid container 13 can pass through into the liquid absorbing assembly 15.

The heater 51 includes a heating element 510 and two clamps 59, the inner surface of each clamp 59 is provided with a slot, and the heating element 510 is inserted into the slots. One of the clamps 59 is connected to a positive contact 54 which can be connected to the circuit board (not shown) once the cartridge 10 is assembled at the in-use state. The other clamp 59 serves as a negative contact. Similarly, combinations of nut and bolt may be provided between each clamp 59 and the corresponding end of the heating element 510 so as to further fasten the heating element 510.

As described above, the liquid absorbing assembly 15 is arranged below the liquid container 13, in some embodiment, for example, a holding sheet is used to hold the liquid absorbing assembly 15. In fact, a holding element may also be used instead of the holding sheet.

The Eighth Embodiment

Figure 8A:
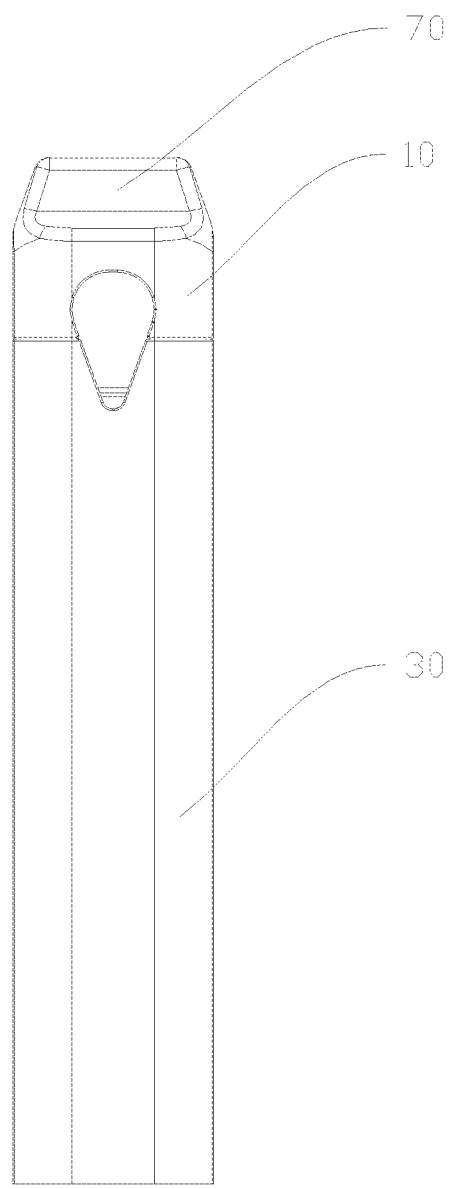
FIG. 8A is a schematic view of a cartridge according to an eighth embodiment of the present disclosure.
Figures 8B, 8C:
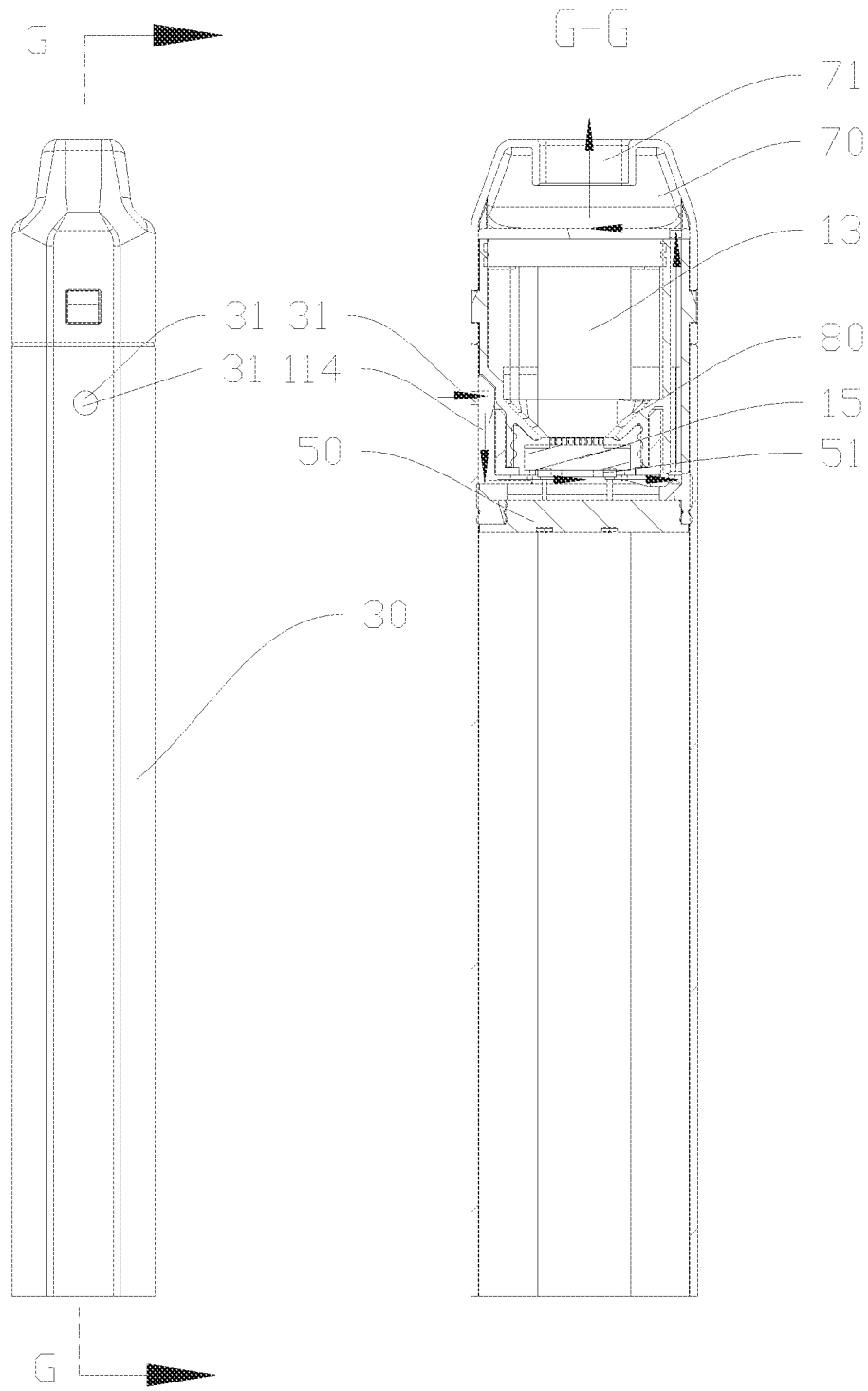
FIG. 8B is a side view of the cartridge of FIG. 8A.
FIG. 8C is a cross-sectional view along A-A line of FIG. 16B.

Referring to FIGS. 8A-8C, the present disclosure of the eighth embodiment provide an electronic cigarette 100, the electronic cigarette 100 includes a cartridge 10, a housing 30 and a battery assembly 50 located within the housing 30.

Referring to FIGS. 8D-8H, the cartridge 10 includes a cartridge shell 11, a holding element 80, a liquid container 13 and a liquid absorbing assembly 15 located in the cartridge shell 11, the upper end of the holding element 80 is sleeved on the bottom of the liquid container 13, the lower end of the holding element 80 is provided with an aperture 81, the liquid absorbing assembly 15 can be inserted into the holding element 80 from the aperture 81.

The liquid container 13 has a convex portion on the bottom, a bottom surface of the liquid container 13 is provided with one or more outflow pathways 101 so that the tobacco liquid stored in the liquid container 13 can penetrate into the liquid absorbing assembly 15 through the outflow pathways 101. An upper surface of the holding element 80 is of a concave shape for accommodating the convex portion of the liquid container 13. The holding element 80 defines one or more through holes 82 in liquid communication with the outflow pathways 101. In fact, the shape of the holding element 80 shown in FIG. 8G is only for illustrative purposes, the holding element 80 can be of any shape as long as it can be sealing sleeved onto the liquid container 13. Besides, since the holding element 80 is formed of silicon when inserting the cartridge 10 into the in-use state, the holding element 80 may protect the liquid absorbing assembly 15 therein from suffering from the external force. Specifically, the liquid absorbing assembly 15 received in holding element 80 can avoid circumferential leakage, under the action of an external force when the cartridge 10 is assembled to the battery assembly 50 at the in-use state. It should be understood that the holding element 80 can also be formed of other soft materials with good flexibility and sealing properties.

The cartridge 10 further includes a mouthpiece 70 located on the top of the liquid container 13. The mouthpiece 70 has an air outlet 71, the cartridge shell 11 defines an outlet air channel 113 located therein. The outlet air channel 113 is in fluid communication with the air outlet 71.

The cartridge shell 11 further defines a third groove 21 located on its outside wall. The third groove 21 and the inner walls of the housing 30 cooperatively define an inner air channel 114.

Outside air enters from the air inlet 31, and then travels downwards along the inner air channel 114, then reaches the region below the heater 51, and after mixing up with vapor generated by the heater 51, it travels upwards through the outlet air channel 113 which is arranged inside the cartridge 10, and finally arrives at the air outlet 71.

Figure 8I:
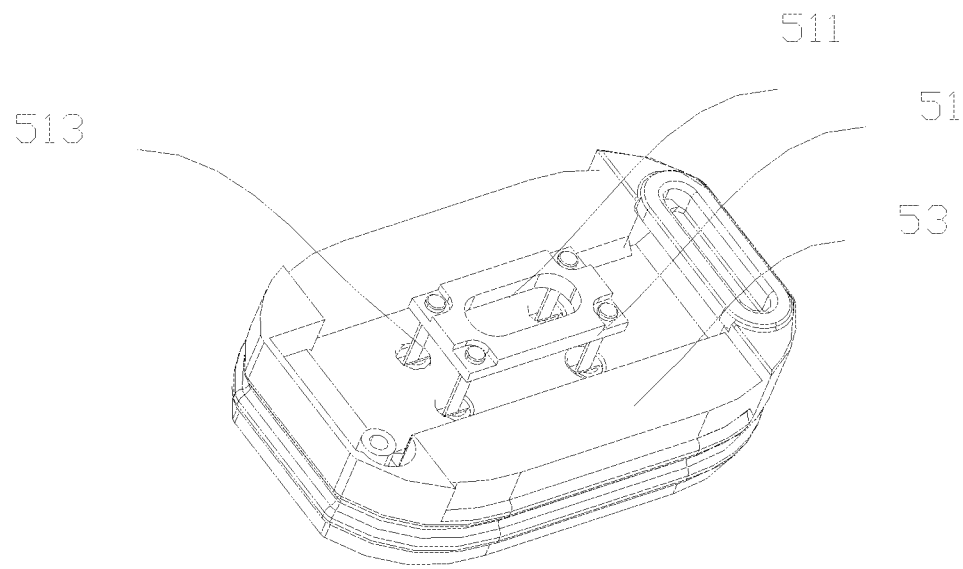
FIG. 8I is a perspective view of the heater show in FIG. 8F.
Figures 8J, 8K:
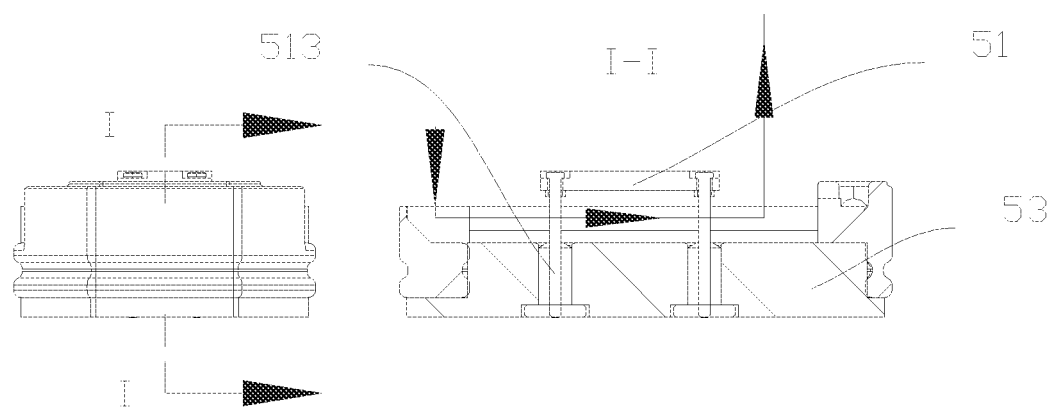
FIG. 8J is a side view of the heater shown in FIG. 8F.
FIG. 8K is a cross-sectional view along I-I line of FIG. 8J.

The battery assembly 50 includes a heater 51 and an insulating element 53. Specifically, as shown in FIGS. 8I-8K, which shows a perspective view of the heater 51 according to the embodiment of the present disclosure, the heater 51 is fixed on the insulating element 53. Since the heater 51 has an opening 511 for the vapor to escape, therefore, there are two heating traces on both sides of the opening 511, two leads 513 are required for each heating trace, one for connecting to the positive pole of the battery and the other one for connecting to the negative pole. So four leads 513 are required in this case. Since vapor may also escape from the peripheral side of the heater 51, in an embodiment, the heater 51 has no openings, at this time, there is only one heating trace, thus only two leads 513 are required, thereby simplifying the assembling process.

It should be noted that the number of the openings 511 on the heater 51 is not limited herein. In fact, the openings 511 of the heater 51 may determine the number of the heating trace of the heater 51 and further determine the number of the leads 513.

In the foregoing, the main assemblies of the electronic cigarette have been described in detail with reference to corresponding drawings. As described above, in some embodiments, the cartridge has an outer casing, at this time, the outer casing of the electronic cigarette is formed by the outer casing of the cartridge and the outer casing of the battery assembly; in some embodiments, the cartridge has no outer casing, at this time, the outer casing of the electronic cigarette actually refers to that of the battery assembly. In fact, in the latter case, the outer casing of the battery assembly is long enough to encase the cartridge. One construction of the electronic cigarette can include an outer casing to encase the battery assembly within about the lower 80% part of the outer casing. The upper 20% of the casing would remain empty until a cartridge is inserted. Before inserting the cartridge, a user may look down from the top opening of the outer casing and see pass the upper 20% of the casing, to see a heater as the bottom of the short "chimney". In one embodiment, as shown in FIG. 1A, when a cartridge is inserted into the casing, only the mouthpiece portion is exposed. The above example of 80% vs. 20% is only for illustrative purposes. One skilled in the art would understand that any percentages of arrangement are possible.

Also, it should be noted that although most of the embodiments shown have a rectangular cross-sectional shape, one skilled in the art would recognize that the electronic cigarette can also have a cylindrical shape, or any other shape, which is not limited herein.

Besides, although the drawing figures show a generally linear configures of mouthpiece on top of the liquid container, which has a liquid absorbing assembly at its bottom touching a heater, which is on top of a battery assembly, it should be especially noted that any other spatial arrangements are possible as long as the same concept is utilized. One of the intended goals is to have a cartridge pre-filled with the liquid within its liquid container, where the liquid container is connected to a liquid absorbing assembly that is exposed for contact with a heater. This cartridge can then be mass produced with different flavors and nicotine levels, or other additives. Furthermore, a user would never have to replace the liquid absorbing assembly of such electronic cigarette because it is part of the cartridge that gets replaced.

Many alterations and modifications may be made by those having ordinary skill in the art without departing from the spirit and scope of the embodiment. Therefore, it must be understood that the illustrated embodiment has been set forth only for the purposes of example.

What is claimed is:

1. A cartridge comprising: a liquid absorbing assembly, and a liquid container for supplying tobacco liquid to the liquid absorbing assembly, wherein:
   the liquid absorbing assembly is arranged in such a manner that the tobacco liquid is loaded in the liquid container before the cartridge is assembled at an in-use state,
   the liquid absorbing assembly further comprises a membrane and a puncturing unit, the membrane is arranged on a bottom of the liquid container, and the puncturing unit is arranged with a predefined distance below the membrane, and
   the cartridge further comprises a heater removably located below the liquid absorbing assembly, the puncturing unit comprises a puncturing element and an elastic element, a first end of the puncturing element is attached to the heater, and a second end of the puncturing element is protruded above the liquid absorbing assembly.

2. The cartridge according to claim 1, wherein the elastic element is elastically compressively disposed between the puncturing element and the bottom of the liquid container, a first end of the elastic element abuts against the puncturing element and a second end of the elastic element abuts against the bottom of the liquid container.

3. The cartridge according to claim 1, wherein the puncturing element is attached to the cartridge or the liquid absorbing assembly, and the elastic element is elastically compressively disposed between the liquid absorbing assembly and the bottom of the liquid container.

4. The cartridge according to claim 1, wherein a liquid adjusting element is removably attached to the cartridge.

5. The cartridge according to claim 4, wherein the liquid absorbing assembly comprises a first absorbing assembly and a second absorbing assembly separated from the first absorbing assembly by the liquid adjusting element, when the liquid adjusting element is assembled at a non-use state.

6. The cartridge according to claim 5, wherein the cartridge further comprises a cartridge shell, the liquid container is located within the cartridge shell, one part of the liquid adjusting element is arranged within the cartridge shell, the liquid adjusting element is provided with an upper positioning slot, a lower positioning slot and a positioning element, the upper positioning slot is arranged in parallel to a bottom surface of the liquid container, and the lower positioning slot is arranged on the bottom of the liquid adjusting element, the positioning element is configured to cooperate with the upper positioning slot and the lower positioning slot to maintain the liquid adjusting element in preset positions.

7. The cartridge according to claim 4, wherein the liquid adjusting element defines one or more liquid adjusting outlets corresponding to one or more outflow pathways defined on the liquid container.

8. The cartridge according to claim 1, wherein the cartridge further includes a heat transferring element arranged below the liquid absorbing assembly, the upper surface of the heat transferring element defines one or more vapor outlets, a first side of the heat transferring element is provided with an air inlet opening, and a second side of the heat transferring element is provided with a vapor outlet opening.

9. The cartridge according to claim 1, wherein the liquid absorbing assembly further comprises a joint element, the joint element is arranged between the liquid container and the liquid absorbing assembly.

10. The cartridge according to claim 9, wherein the joint element is made of an elastic material.

11. The cartridge according to claim 1, wherein the cartridge further comprises a holding element, the upper end of the holding element is sleeved on the bottom of the liquid container, the lower end of the holding element is provided with an aperture, and the liquid absorbing assembly is inserted into the holding element from the aperture.

12. An electronic cigarette comprising the cartridge of claim 1 and a battery assembly electrically connected to the cartridge.

* * * * *